(No Model.)

A. B. LANDIS.
GRINDING MACHINE.

No. 483,288.

Patented Sept. 27, 1892.

Fig. 1.

WITNESSES:
Walter Allen
L. S. Thomann

INVENTOR
A. B. Landis.
BY
Herbert W. T. Jenner.
ATTORNEY.

(No Model.) 9 Sheets—Sheet 6.

A. B. LANDIS.
GRINDING MACHINE.

No. 483,288. Patented Sept. 27, 1892.

WITNESSES:
Walter Allen
F. J. Thomason

INVENTOR
A. B. Landis
BY
Herbert W. T. Jenner
ATTORNEY.

THE NORRIS PETERS CO., PHOTO-LITHO., WASHINGTON, D. C.

(No Model.)  9 Sheets—Sheet 7.

A. B. LANDIS.
GRINDING MACHINE.

No. 483,288. Patented Sept. 27, 1892.

Fig. 16.

WITNESSES:
Walter Allen
L. S. Thomason

INVENTOR
A. B. Landis
BY
Herbert W. T. Jenner.
ATTORNEY.

(No Model.) 9 Sheets—Sheet 9.

A. B. LANDIS.
GRINDING MACHINE.

No. 483,288. Patented Sept. 27, 1892.

WITNESSES:
Walter Allen
L. S. Thomason

INVENTOR
A. B. Landis.
BY
Herbert W. T. Jenner.
ATTORNEY.

UNITED STATES PATENT OFFICE.

ABRAHAM B. LANDIS, OF WAYNESBOROUGH, PENNSYLVANIA.

GRINDING-MACHINE.

SPECIFICATION forming part of Letters Patent No. 483,288, dated September 27, 1892.

Application filed February 27, 1892. Serial No. 423,006. (No model.)

*To all whom it may concern:*

Be it known that I, ABRAHAM B. LANDIS, a citizen of the United States, residing at Waynesborough, in the county of Franklin and State of Pennsylvania, have invented certain new and useful Improvements in Grinding-Machines; and I do hereby declare the following to be a full, clear, and exact description of the invention, such as will enable others skilled in the art to which it appertains to make and use the same.

This invention relates to grinding-machines; and it consists in the novel construction and combination of the parts hereinafter fully described and claimed.

In the drawings,
Fig. 17 is a side view of the grinding-wheel bracket, showing the supporting-plates in section.
Fig. 18 is an end view of the devices shown in Fig. 17, also partly in section.
Fig. 19 is a section through the pinion for moving the grinding-wheel bracket, taken on the line $w\ w$ in Fig. 17.
Fig. 20 is a plan view from above, partly in section, of the devices for adjusting the position of the grinding-wheel bracket and the bracket for supporting the said devices.
Fig. 21 is a rear view of the hand-wheel shown in Fig. 20.

A is the bed of the machine.

$a$ is the head-stock, and $a'$ is the foot-stock. The work to be ground is supported on centers between the head-stock and foot-stock and is revolved by the pulley 2.

Figure 4:
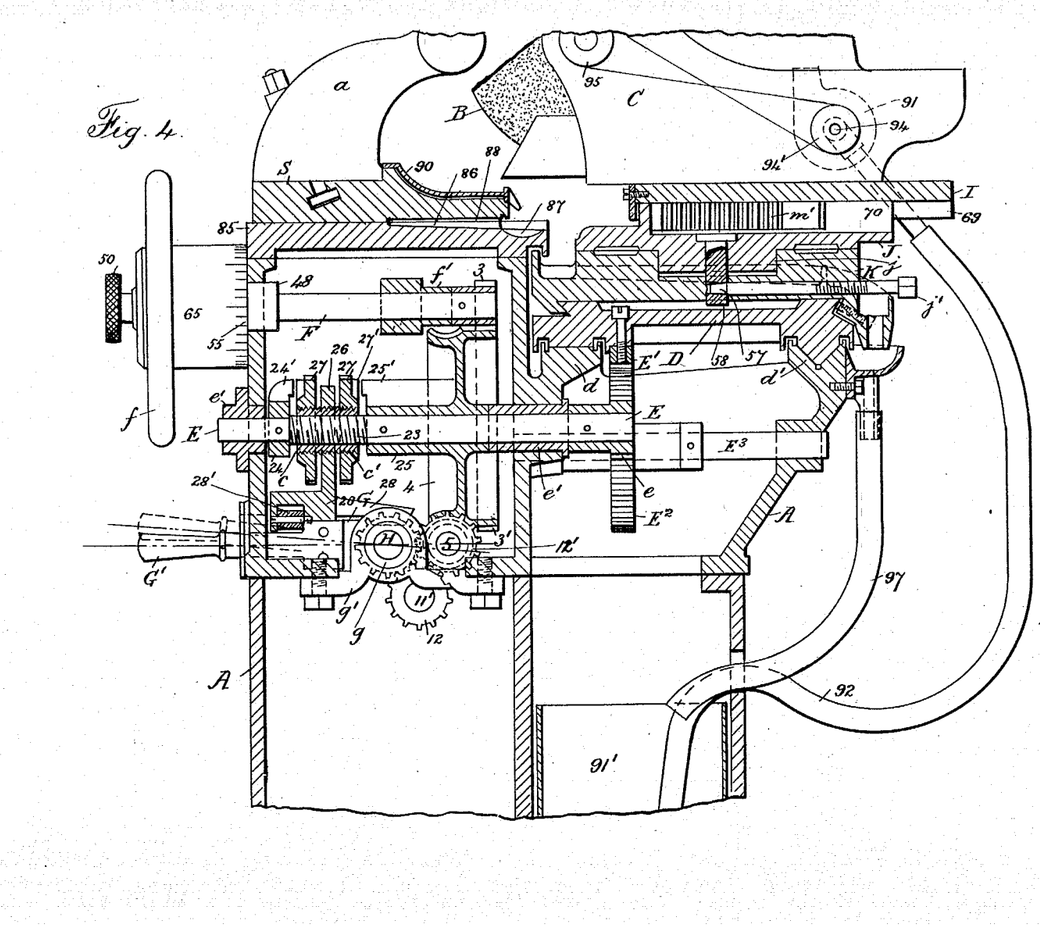
Fig. 4 is a cross-section through the bed, taken on the line $x\ x$ in Fig. 1, and shows the longitudinal traverse mechanism.

B is the grinding-wheel, provided with the pulley $b$ for revolving it in contact with the work. This grinding-wheel is supported by a bracket C, and is carried by the carriage D. The carriage D rests against the guides $d\ d'$ on the bed, as shown in Fig. 4, and is adapted to be traversed longitudinally by the mechanism, which will now be described. A shaft E is journaled in the bearings $e'$, secured to the bed, and has a toothed pinion $e$ secured upon its end. This toothed pinion $e$ gears into an idle toothed wheel $E^2$, journaled on a shaft $E^3$, which gears into a longitudinal toothed rack E', secured to the carriage D. A second shaft F is journaled in bearings $f'$ and 48 above the shaft E, and has a hand wheel $f$ connected to one end of it outside the bed. A toothed pinion 3 is secured on the other end of the shaft F and gears into a toothed wheel 3', secured upon the shaft E. The carriage is traversed in either direction by turning the hand-wheel $f$.

Figure 5:
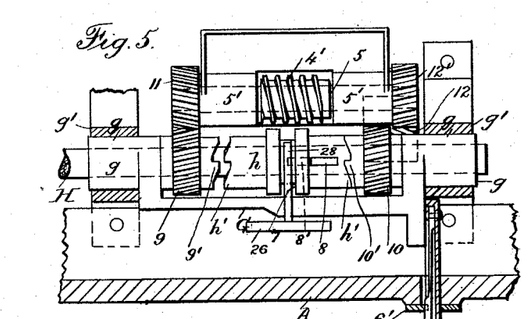
Fig. 5 is a plan view from above of the pivoted bracket for supporting the traverse-worm and the wheels for revolving it.
Figure 6:
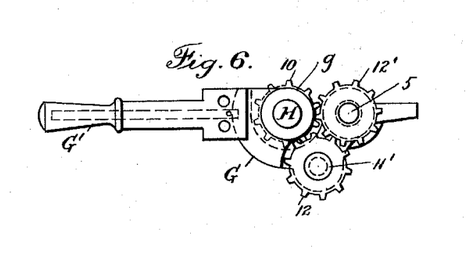
Fig. 6 is an end view of the said bracket and the wheels, as shown in Fig. 5.
Figure 7:
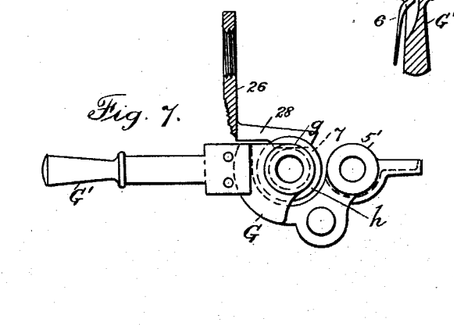
Fig. 7 is an end view of the said bracket by itself.

In order that the carriage may be traversed automatically as well as by hand, a worm-wheel 4 is formed integral with the wheel 3', or is otherwise secured upon the shaft E. A worm 4' is secured upon a short shaft 5, journaled in bearings 5' on the bracket G and gears into the worm-wheel 4. The bracket G is provided with trunnions $g$, which are journaled in similar brackets $g'$, secured to the bed, as shown in Figs. 4 and 5.

G' is a handle, which is secured to the bracket G and projects through a slot in the front of the bed. The worm is thrown into and out of gear with the worm-wheel by lowering or raising the handle G' and turning the bracket on its trunnions. A spring catch 6 is secured to the handle and is adapted to engage with notches in a plate 6', secured to the bed, so that the worm may be held in or out of gear with the worm-wheel.

H is a longitudinal shaft, which passes through the trunnions $g$ and is provided with the sliding sleeve $h$, having similar clutch-jaws $h'$ on its ends. The sleeve $h$ is provided with a circumferential groove 7, and 8 is a key, which is secured in holes in the sleeve and is adapted to slide back and forth in a long slot 8' in the shaft H. Toothed wheels 9 and 10 are journaled on the shaft H and have the clutch-jaws 9' and 10' projecting from their sides and adapted to engage with the clutch-jaws $h'$. The toothed wheel 9 gears into a similar toothed wheel 11, secured on the end of the shaft 5, and drives the worm and traverses the carriage in one direction when the sleeve is connected to the clutch-jaw 9'. The toothed wheel 10 gears into an idle toothed wheel 12, journaled on a pin 11', projecting from the bracket G. This idle-wheel is very broad on the face and gears also into a toothed wheel 12', secured upon the other end of the shaft 5. The toothed wheel 10 drives the worm and traverses the carriage in the opposite direction when the sleeve $h$ is connected to the clutch-jaw 10'. The teeth of the wheels 9, 10, 11, 12, and 12' are spiral teeth, so that the wheels may run silent and so that the use of retaining-collars on the shaft H may be dispensed with. The sleeve $h$ is slid back and forth, to reverse the motion of the carriage, automatically or by hand, by means of mechanism which will be more fully described hereinafter.

Figures 2, 3:
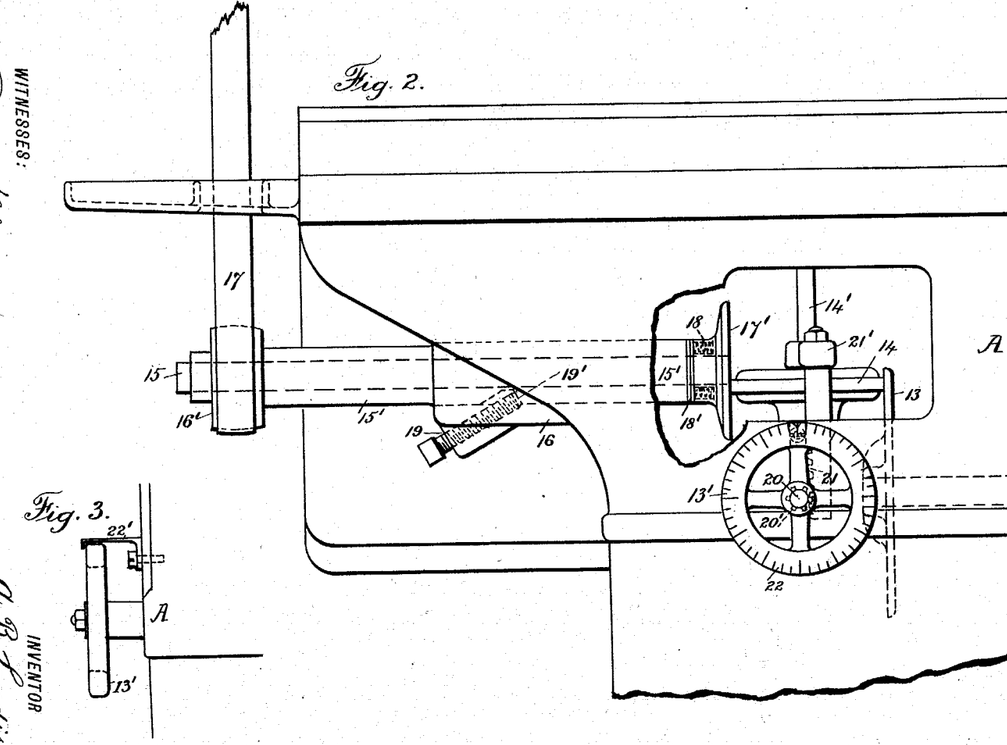
Fig. 2 is a front view of one end of the bed showing the friction-wheels for driving the longitudinal traverse mechanism.
Fig. 3 is a side view of the graduated hand-wheel shown in Fig. 2.

The shaft H may be revolved by any approved driving mechanism, but frictional driving mechanism, as shown in Fig. 2, is preferred. A friction-disk 13 is secured upon the end of the shaft H inside the bed. A horizontal friction-disk 14 is journaled on a vertical pin 14' and is slid up and down on the pin by the hand-wheel 13'. A shaft 15 is journaled in the sleeve 15', supported by the boss 16 on the bed A. A belt-pulley 16' is secured to the end of the shaft 15 outside the bed and has motion imparted to it by the belt 17. A friction-disk 17' is secured on the opposite end of the shaft 15, and the horizontal friction-disk 14 is arranged between the two disks 13 and 17', so that the shaft H may be revolved by the belt 17. The necessary pressure for producing the frictional driving contact of the disks is obtained from the springs 18, carried in pockets in the hub of the disk 17', which springs press the washers 18' against the end of the sleeve 15'. The sleeve is set up against the pressure of the springs by means of the inclined set-screw 19 in the boss 16, which screw bears against a shoulder 19' on the sleeve and enables the sleeve to be moved longitudinally in the said boss. The disk 14 is preferably made of leather, and the speed of the traverse motion is varied by moving it vertically on its pin 14'. The hand-wheel 13' is secured on one end of a shaft 20, journaled in a boss on the bed, and the shaft 20 has a toothed pinion 20' secured on its opposite end. This pinion 20' gears into a rack 21, secured to the arm 21', which engages with the hub of the friction-disk 14, so that the disk may revolve free of the rack. The hand-wheel is provided with graduations 22, and 22' is a pointer secured to the bed, as shown in Fig. 3, so that the operator is enabled to turn the hand-wheel to place the friction-disk in such positions as are necessary to produce the various speeds of traverse required for different sorts of work.

Figure 8:
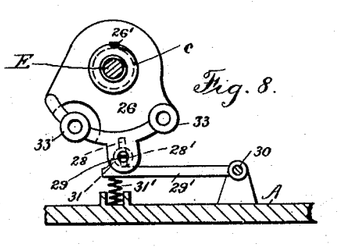
Fig. 8 is a front view of the oscillating plate for reversing the traverse mechanism.

The reversal of the traverse mechanism at the ends of its travel is effected automatically by the devices for sliding the clutch-sleeve $h$, which will now be described. The shaft E is provided with screw-threads 23, and $c$ is a screw-threaded sleeve which slides back and forth for a limited distance upon the said screw-threads 23 between the collar 24, secured to the shaft and the end of the hub 25 of the worm-wheel. The collar 24 is provided with a lug 24' and the hub 25 is provided with a lug 25'. The sleeve $c$ is provided with screw-threads $c'$ upon its periphery, and the pitch and direction of the screw-threads 23 and $c'$ are preferably exactly the same. A plate 26 is rigidly secured on the middle of the sleeve $c$ by the key 26', and 27 are toothed wheels provided with screw-threaded hubs mounted on the sleeve $c$ on each side of the plate 26. Each wheel 27 is provided with a lug 27', which is adapted to engage with the lug 24' or 25', to which it is next adjacent. An arm 28 projects from the plate 26 and engages loosely with the groove 7 in the clutch-sleeve $h$. A roller 28' is journaled on the pin 29, secured to the lower part of the plate 26, and 29' is a lever pivoted at one end to the bed A by the pin 30, as shown in Fig. 8, and provided at its other end with a wedge-shaped projection 31. A spring 31' is arranged below the lever 29', so as to press the inclined surfaces of the projection against the roller. When the automatic longitudinal traverse-gear is in operation and the shaft H is being revolved, as hereinbefore described, the sleeve $c$ is slid longitudinally of the shaft E by means of the screw-threads on the said shaft, which engage with the sleeve. As the sleeve moves along the shaft it carries with it the plate 26 and the two wheels 27, the direction of the motion being according to the connection of the clutch-sleeve $h$ with the clutch-jaws 9' or 10', as hereinbefore described. The wheels 27 do not change their relative positions with regard to each other and the plate 26 while the sleeve is being moved lengthwise of the shaft E, because the teeth of the wheels 27 are in gear with the teeth of the pinions 32, which pinions are prevented from revolving, as will be more fully described hereinafter.

Figures 9, 10, 11:
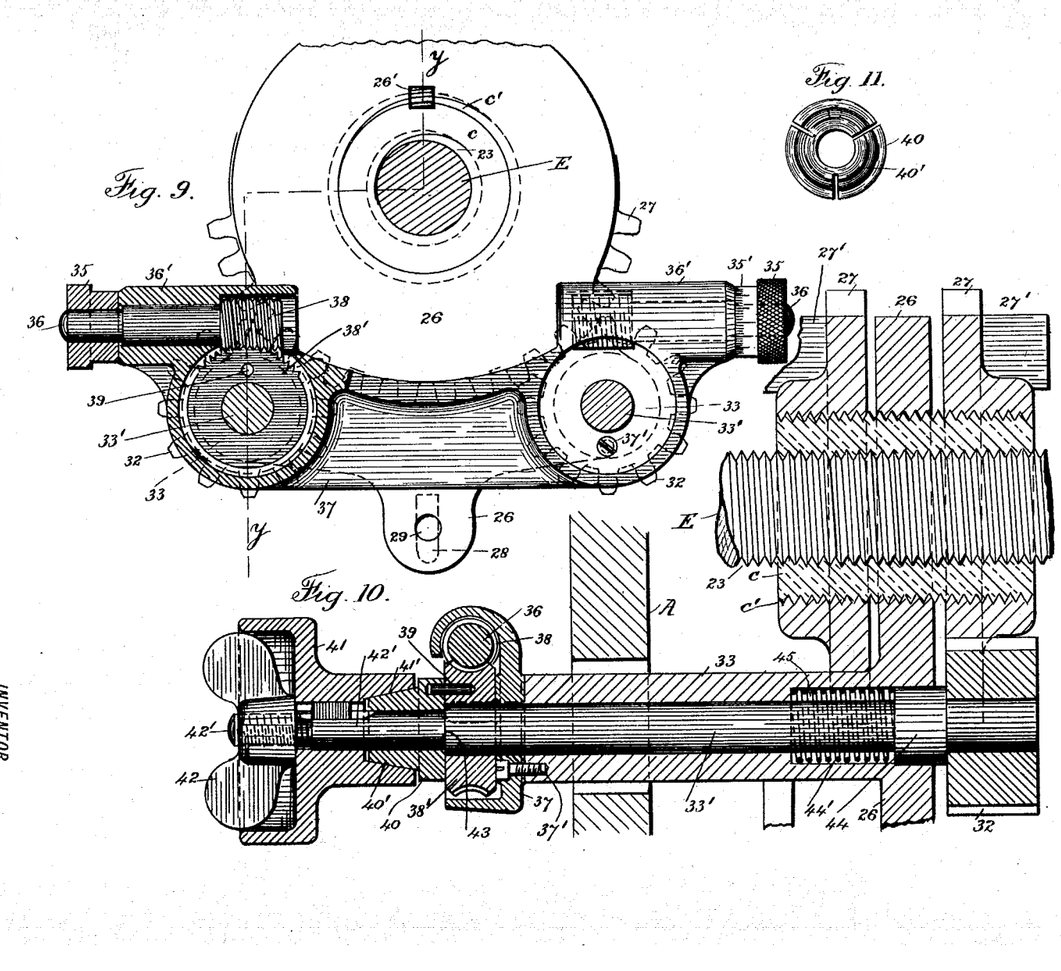
Fig. 9 is a front view of the oscillating plate for reversing the traverse mechanism, drawn to a larger scale and partly in section.
Fig. 10 is a longitudinal section through the reversing devices, taken on the line $y\ y$ in Fig. 9.
Fig. 11 is a front view of the conical clutch-sleeve.

The plate 26 is provided with two bearings 33 at its lower part, as clearly shown in Figs. 9 and 10. A small shaft 33' is journaled in each of these bearings and projects through an opening in the front of the bed of the machine. A toothed pinion 32 is secured upon the inner end of each shaft 33' and the two pinions gear into the two wheels 27. One of the shafts 33' and its bearing is longer than the other shaft and its bearing, so as to enable each pinion 32 to gear into its respective wheel 27; but otherwise the two shafts 33' and their operating mechanisms are exactly alike. When the sleeve c has been moved lengthwise of the shaft E sufficiently to cause one of the lugs 27' to be engaged by one of the lugs 24' or 25', according to the direction of the motion, the lug 24' or 25', which always revolves with the shaft E and which thus engages with the lug 27' on one of the wheels 27, turns the wheel 27, thus coupled to it, and also turns the sleeve c on the shaft E. This circular motion of the sleeve c oscillates in one direction the pinion 32, engaging with the said wheel 27, together with the plate 26, by which the said pinion and its shaft are supported. The other wheel 27 is also partially revolved and its pinion is also oscillated, but their motion does not affect the action of the device at this period. The above-described motion of the plate 26 causes the arm 28, projecting therefrom, to move the clutch-sleeve h longitudinally, thereby disengaging the clutch-jaws. The traversing worm stops directly the clutch-jaws are uncoupled at one end of the sleeve. The motion of the plate 26 also carries the roller 28' over the point of the wedge-shaped projection 31, and the spring under the lever forces the wedge-shaped projection against the roller and shoots the clutch-sleeve h still farther in the same direction, and thereby causes the clutch-jaw on the opposite end of the sleeve to engage with the clutch-jaw on the pinion toward which the said sleeve is moved. This change of connection of the clutch-sleeve from one to the other clutch-jaw and pinion at the extremities of its travel reverses the direction of the traverse of the grinding-wheel, as hereinbefore described. The other wheel 27 effects the reversal of the traversing mechanism at the end of the return stroke in a similar manner to that above described. It is essential that the arm 28 should fit loosely in the groove 7 in order that the wedge-shaped projection may secure a working bearing against the roller 28' when the plate is oscillated. The length of the longitudinal traverse is varied by changing the relative positions of the wheels 27 on the ends of the sleeve c. When the wheels 27 are revolved on the screw-threaded sleeve c so as to be close to the plate 26, they and the sleeve have to be moved longitudinally for a considerable distance before their lugs can engage with the lugs on the collar and on the wheel-hub to cause the reversal of the traversing mechanism, and the extent of the traverse is therefore considerable. The reverse of this occurs when the wheels 27 are moved apart upon the sleeve c, as shown in Figs. 4 and 10, and the traverse is then consequently very short.

The traversing gear may be reversed by hand when desired by taking hold of any projecting portion connected to the plate 26, and rocking the said plate to the right or to the left to move the clutch-sleeve h, according to the desired change in the direction of the motion. The exact adjustment of the length of the traverse is effected by means of the knob 35, one of which is provided for each shaft 33'. The knob 35 is provided with graduations 35', which permit it to be turned to adjust the traverse to the one-thousandth part of an inch. The knob 35 is secured upon one end of a shaft 36, journaled in a bearing 36' on the plate 37, which is secured to the projecting ends of the bearings 33 by the screws 37'. A small worm 38 is secured on the other end of the shaft 36 and gears into a worm-wheel 38', which runs loose on the shaft 33'. A pin 39 projects laterally from the worm-wheel 38' and engages with a hole in the split sleeve 40, which is provided with a conical portion 40', as shown in Figs. 10 and 11. A hand-knob 41 is splined on the end 42' of the shaft 33' and is provided with the conical portion 41', encircling the conical end of the sleeve 40. A thumb-nut 42 is screwed upon the end 42' of the shaft 33', and when this nut is tightened up it presses the sleeve 40 against the shoulder 43 on the shaft and causes the conical portion 41' to compress the split sleeve upon the shaft. The sleeve grips the shaft when compressed and connects the worm-wheel to the shaft, so that the shaft is revolved when the knob 35 is turned, as hereinbefore described. After the traverse of the grinding-wheel has been set the grinding-wheel can be moved beyond the reversing-point to examine the work or for any other purpose, and returned to the reversing-point without resetting, in the following manner: A collar 44 is formed on the shaft 33', and 44' is a spring seated in a chamber 45 in the bearing 33. This spring holds the split sleeve 40, connected to the pin 39, projecting from the worm-wheel. The shaft 33' can be drawn back forcibly by pulling the hand-knob against the pressure of the spring until the split sleeve 40 is clear of the pin, and the shaft can then be turned freely in either direction and restored to its original position.

Figure 12:
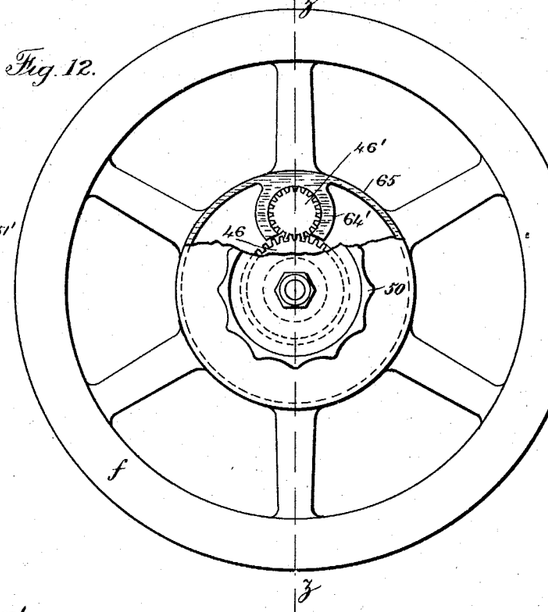
Fig. 12 is a front view of the hand-wheel for operating the longitudinal traversing mechanism by hand, with a portion of the cover-plate broken away to show the wheels in the hub of the hand-wheel.
Figure 13:
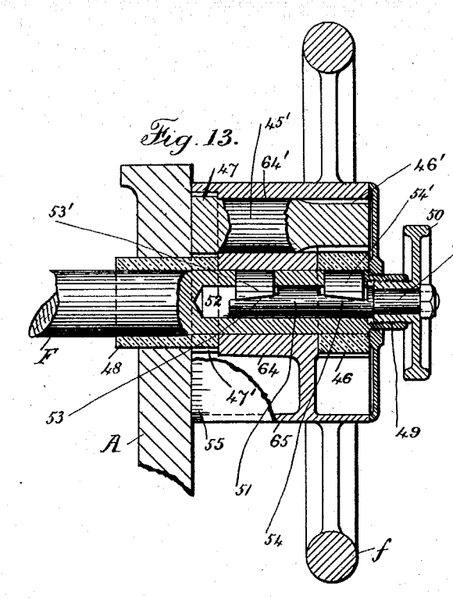
Fig. 13 is a longitudinal section through the hand-wheel, taken on the line $z\ z$ in Fig. 12.
Figure 14:
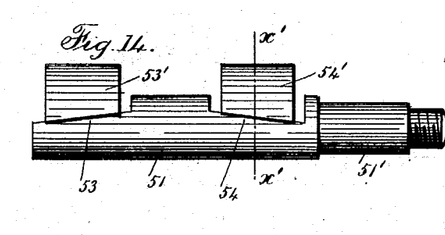
Fig. 14 is a detail view of the locking devices shown in Fig. 13.
Figure 15:
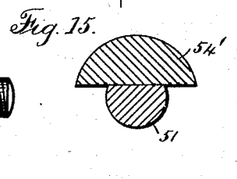
Fig. 15 is a cross-section through the locking devices, taken on the line $x'\ x'$ in Fig. 14.

The automatic traversing mechanism is thrown out of gear by raising the handle G' to the position indicated by the dotted lines in Fig. 4, and the grinding-wheel can then be traversed by means of the hand-wheel f. This hand-wheel is shown in detail in Figs. 12 and 13. The inner hub 64 of the hand-wheel $f$ is journaled on the end of the shaft F, and 64' is a bearing in the outer hub 65, in which the shaft 45' is journaled parallel with the shaft F. A toothed wheel 46 is journaled on the end of the shaft F, in front of the inner hub 64, and gears into a toothed wheel 46' on the front end of the shaft 45', as shown in Fig. 12. A toothed wheel 47 is also formed on the other end of the shaft 45'. This toothed wheel 47 is a little larger in diameter than the toothed wheel 46', but otherwise it is similar to it. The wheel 47 gears into a toothed wheel 47', formed on the end of the bearing-bush 48, in which the shaft F is journaled, the said bush being driven tightly into a hole in the bed A, so that the wheel 47' cannot revolve. The end 49 of the shaft F is screw-threaded internally, and 50 is a hand-wheel provided with a screw-threaded hub which engages with the internal screw-thread in the end of the shaft. A locking-bolt 51 is provided with a bearing 51', which is journaled in the hub of the hand-wheel 50, and the said locking-bolt is slid longitudinally in the hole 52 in the shaft F by turning the hand-wheel. Two inclined portions 53 and 54 are formed on the locking-bolt and have their inclinations in opposite directions upon one side of it, and 53' and 54' are friction-blocks which bear against the said inclined portions and project through lateral holes in the shaft F. The block 53' is arranged to bear against the inner hub 64 of the hand-wheel, and the block 54' bears against the hub of the wheel 46. When the locking-bolt is pushed in, the hand-wheel $f$ is coupled direct to the shaft F and the block 54' is released, so that the toothed wheels are revolved idly. When the locking-bar is pulled out, the block 53' is released and the block 54' is caused to couple the wheel 46 to the shaft F. By revolving the hand-wheel the shaft 45' is also caused to revolve because its wheel 47 gears into the stationary wheel 47'. This motion of the shaft 45' turns the wheel 46', which gears into the wheel 46 and revolves the shaft F so as to permit a very fine adjustment of the length of the traverse. Graduations 55 are formed on the outer hub 65 to indicate an adjustment of one-thousandth of an inch. When the hand-wheel 50 is turned to place the locking-bolt in a central position, the hand-wheel $f$ may be revolved without turning the shaft F. This uncoupling of the hand-wheel from the shaft F is desirable because when a high-speed automatic traverse is being used the hand-wheel $f$ would, if coupled to the shaft F, act like a fly-wheel, and its momentum would produce severe shocks in the reversing mechanism at the points of reversing.

Figure 16:
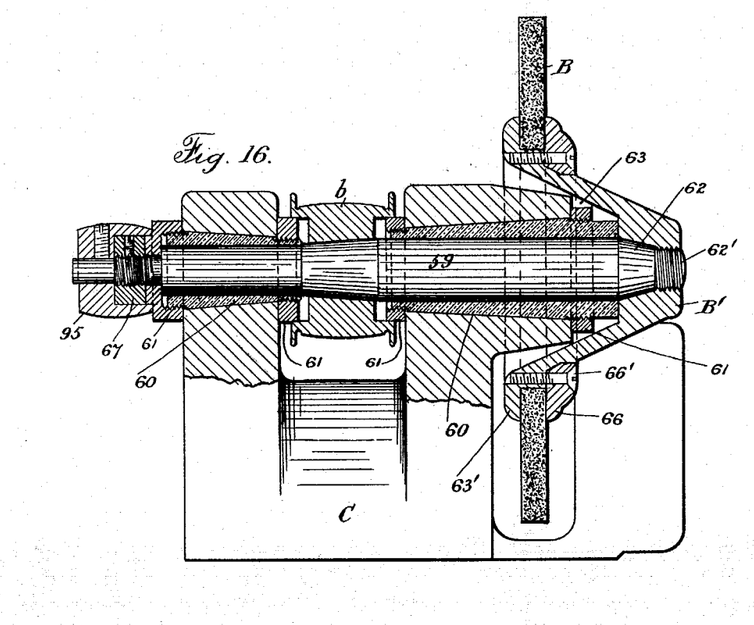
Fig. 16 is a longitudinal section through the bearings of the grinding-wheel, taken on the line $v\ v$ in Fig. 1.

The grinding-wheel B (shown in detail in Fig. 16) is mounted on the shaft 59, carried by the bracket C, and is revolved by the belt-pulley $b$, secured on the said shaft. The bracket C is provided with conical split bearing-sleeves 60, and 61 are nuts for moving the sleeves longitudinally, so as to take up the wear. A cone 62 and a screw-threaded portion 62' are formed on the end of the shaft 59.

B' is the carrier for the emery-wheel, screwed upon the end 62' of the shaft 59 and held true by the cone 62. The carrier is provided with a chamber 63 upon one side, which partially incloses the shaft-bearing, and 63' is a flange at the outer edge of the chamber for the emery-wheel to bear against. The emery-wheel is clamped against the flange by means of the ring 66 and the screws 66'. This construction permits a very long bearing to be used next to the emery-wheel, and causes the pressure to be more evenly distributed over the bearing, besides economizing space. A nut 67 is provided on the outer end of the grinding-wheel shaft for taking up the wear endwise.

Figure 1:
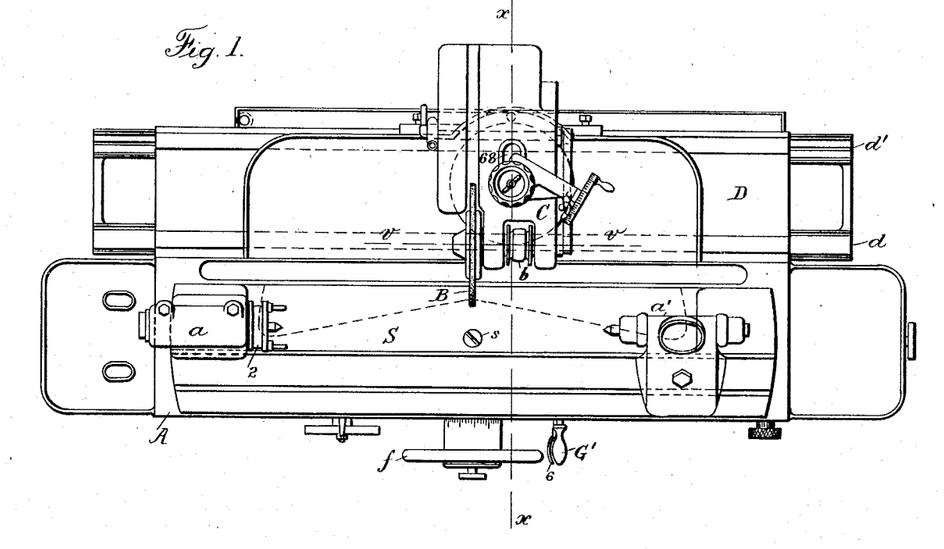
Figure 1 is a plan view of the grinding-machine from above. All the other figures show details of various parts of the machine and are drawn to a larger scale.
20
Figures 17, 18, 19, 20, 21:
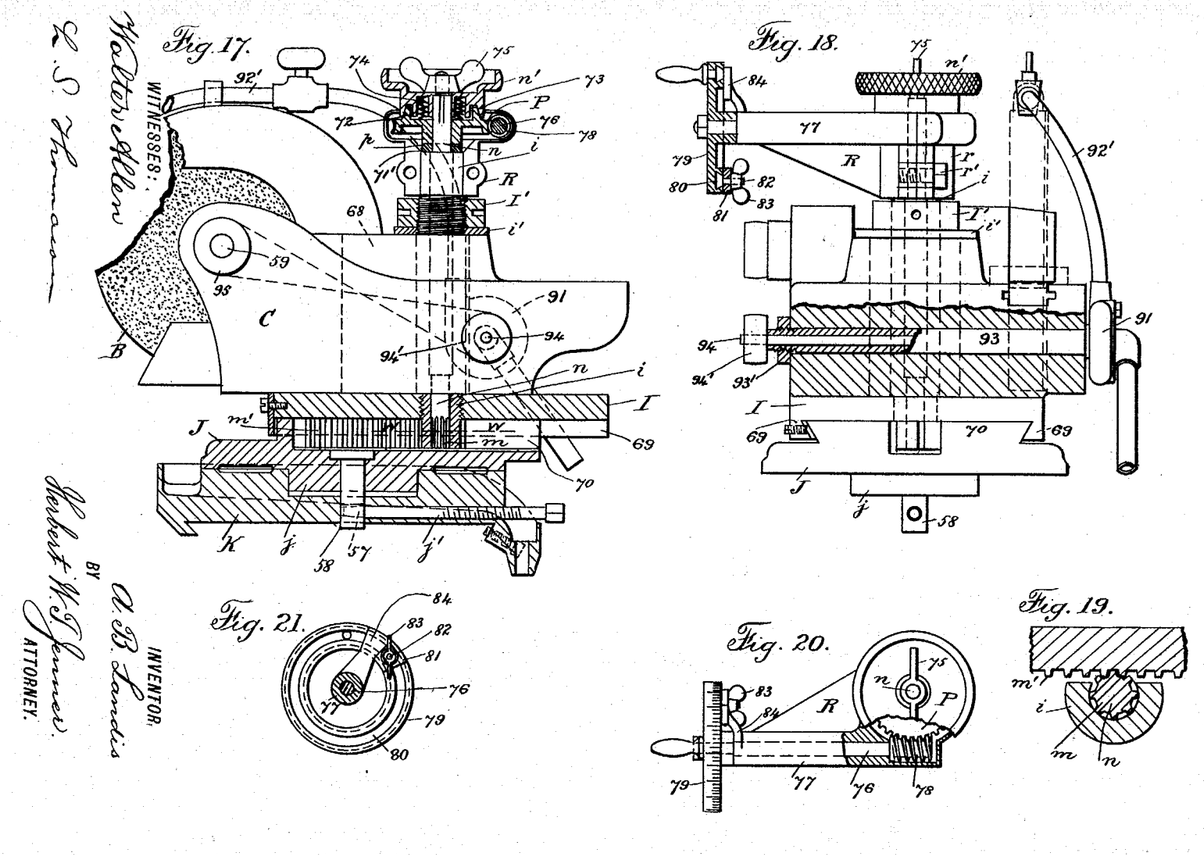

The grinding-wheel bracket C is provided with a central vertical slot 68, as shown in Figs. 1 and 17, which permits the bracket C to be moved about in every direction on the sleeve $i$ before being clamped. The sleeve $i$ is secured to the reciprocating plate I, and I' is a nut and $i'$ is a washer for clamping the bracket C to the said sleeve and plate. The reciprocating plate I is provided with beveled flanges 69, which slide upon the guide 70 on the revoluble plate J. The revoluble plate J is provided with a central boss $j$, which is journaled in a hole in the bracket K, and $j'$ is a set-screw engaging with a bracket K and provided with a conical end 57, engaging with a similar hole in the pin 58, which projects through the plate J into the bracket K, so that the plate J may be clamped to the bracket by forcing the end of the set-screw into the tapered hole in the said pin. The bracket K is secured to the carriage D in any convenient manner, or it may be formed integral with the carriage.

A small centrifugal pump 91 of approved construction is provided for supplying the grinding-wheel with water. This pump draws its water from a tank 91' through the flexible suction-pipe 92, as shown in Fig. 4, and delivers its water through the pipe 92', as shown in Figs. 17 and 18. The pump is provided with a long bearing 93, which passes clear through the bracket C and is secured by a nut 93'. The driving-shaft 94 of the pump is journaled in this bearing and is provided with a belt-pulley 94'. The pump is driven by a belt from the belt-pulley 95 on the end of the grinding-wheel shaft 59, as indicated in Fig. 17. By this construction the supply of water is kept constant as long as the grinding-wheel is being revolved, and the pump discharge-pipe and the grinding-wheel are always kept in the same relative positions.

The pipe 97 (shown in Fig. 4) is for returning the waste water into the tank. The plate I and the grinding-wheel are moved back and forth by means of the toothed pinion $m$ on the lower end of the shaft n, which is journaled in the sleeve i. This pinion gears into a rack m', secured to the plate J. The shaft n is revolved by the hand-knob n', which is splined on the upper end of the shaft n.

P is a worm-wheel journaled on the upper part of the shaft n and the worm-wheel rests on the washer p, which bears against the shoulder 71' on the shaft. A friction-clutch 72 is formed on the worm-wheel P and engages with a friction-clutch 73 on the hand-knob n'. Springs 74 are interposed between the worm-wheel and the hand-knob for keeping the clutches apart. A thumb-nut 75 is screwed on the end of the shaft for pressing the clutches together, and thereby connecting the worm-wheel to the shaft n when required.

R is a bracket journaled on the upper end of the sleeve i and provided with the cap r and bolts r', so that it may be clamped to the sleeve after it has been revolved to any desired position. A shaft 76 is journaled in the bearing 77 on the bracket R and is provided with a worm 78 on one end for gearing into the worm-wheel P. A hand-wheel 79 is secured on the other end of the shaft 76, and this hand-wheel, together with the worm and the worm-wheel, affords a means for giving a very fine adjustment to the grinding-wheel bracket. The hand-wheel 79 is provided with a circular dovetailed groove 80, and 81 is a stop adapted to be secured to the wheel in any desired position by means of the bolt 82, provided with a dovetailed head sliding in the groove 80 and the thumb-nut 83 on the said bolt. An arm 84 projects from the bearing 77 for the stop to strike against and is adapted to arrest the movement of the grinding-wheel bracket at the desired point. When the worm-wheel is disconnected from the shaft n, a rough but rapid adjustment of the grinding-wheel bracket may be made by turning the hand-knob n'.

Figure 22:
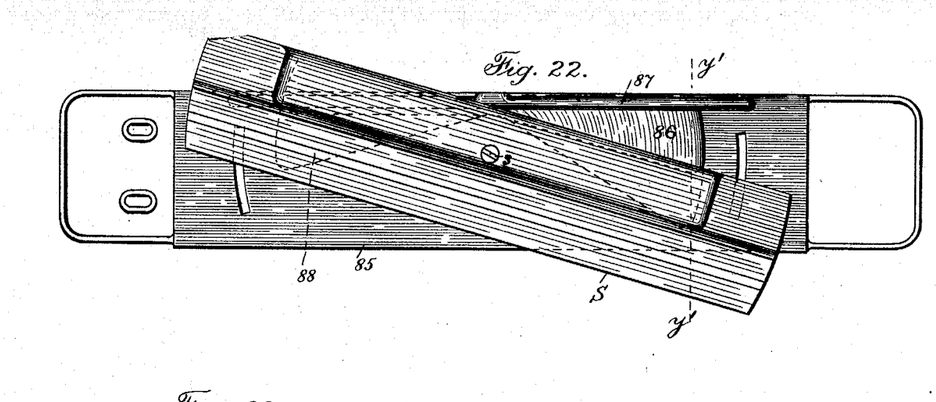
Fig. 22 is a detail plan view from above of the pivoted table on top of the bed.
Figure 23:
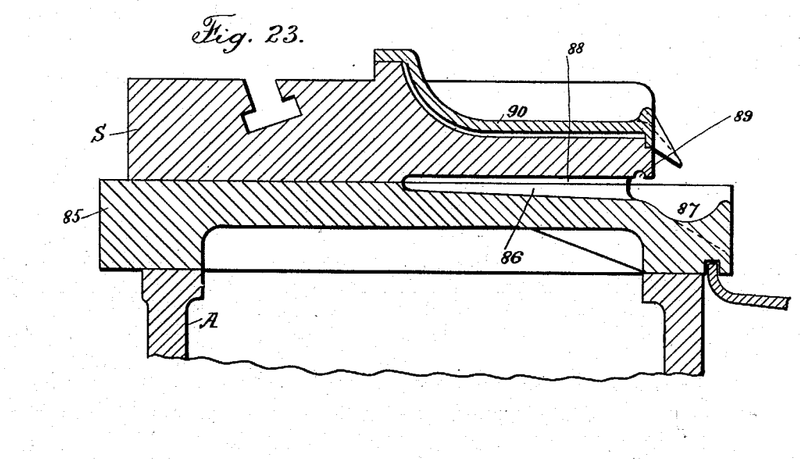
Fig. 23 is a cross-section through the said pivoted table, taken on the line $y'\ y'$ in Fig. 22.

S is the table, pivoted by the pin s to the plate 85, which is firmly secured to the upper part of the bed A, as shown in Fig. 22. The table S carries the head-stock and the foot-stock and is adapted to be turned upon the pin s so that the machine may be able to grind tapered work in the usual manner. A recess 86 is formed in the upper surface of the plate 85 on each side of the pin s and extends all over that surface of the plate which is exposed by turning the table on the pin. The grindings, water, and other matter fall into the recess 86 and do not come in contact with the finished surface of the plate, and therefore cannot spoil the joint between the plate and the table. A gutter 87 is formed in the projecting part of the plate 85 for carrying off the water. A similar recess 88 is formed in the under side of the table on each side of the pin s to correspond with each recess 86. A longitudinal groove 89 is also formed in the under side of the table close to its front edge to prevent the water from creeping over the surface of the recesses 88 and getting to the finished bearing-surfaces of the table and plate. A guard 90 is attached to the top of the table in the usual manner for catching the water and the grindings and discharging them into the gutter 87.

What I claim is—

1. The combination, with the shaft E, adapted to traverse the grinding-wheel, and the worm-wheel secured on the said shaft, of a longitudinal driving-shaft, a bracket provided with trunnions encircling the said longitudinal shaft, a worm secured on a short shaft journaled in the bracket and adapted to be moved into and out of gear with the worm-wheel by turning the bracket on its trunnions, and driving-wheels operatively connecting the worm-shaft with the longitudinal shaft, substantially as set forth.

2. The combination, with the longitudinal driving-shaft H, of a bracket for carrying the driving-worm, the driving-worm secured on a short shaft journaled in the bracket and adapted to drive the mechanism for traversing the grinding-wheel, a toothed idle-wheel mounted on a pin projecting from the bracket, the toothed wheels provided with clutch-jaws and mounted on the shaft H, the toothed wheels secured on the worm-shaft, and a sliding sleeve provided with clutch-jaws and revolved by the shaft H, whereby the direction of the traverse may be reversed, substantially as set forth.

3. The combination, with the shaft E, adapted to traverse the grinding-wheel, and the worm-wheel secured on the said shaft, of the longitudinal driving-shaft H, a bracket for carrying the driving-worm, the driving-worm secured on a short shaft journaled in the bracket, the toothed driving-wheels and the sliding clutch-sleeve revolving with the shaft H for driving the worm in opposite directions, a sleeve mounted on a screw-threaded portion of the shaft E, an oscillating plate secured on the said sleeve and operatively connected with the said sliding clutch-sleeve, and lugs operatively connected to the shaft E at each end of the sleeve and adapted to engage with lugs operatively connected with the said plate at each end of the travel of the sleeve on the shaft, whereby the said plate may be rocked and the clutch-sleeve slid on the shaft H to reverse the direction of the traverse of the grinding-wheel, substantially as set forth.

4. The combination, with the shaft E, adapted to traverse the grinding-wheel, and the toothed wheel and the worm-wheel, both rigidly secured on the said shaft, of a shaft provided with a toothed pinion gearing into the said toothed wheel and a hand-wheel for operating the traverse by hand, a worm operatively connected with a driving-shaft and adapted to operate the traverse automatically, and means for disengaging the said hand-wheel and the said worm from operative connection with the said toothed wheel and with the said worm-wheel, respectively, substantially as set forth.

5. The combination, with the shaft H for actuating the traverse mechanism, and the friction-disk secured on the said shaft, of a sleeve sliding in a boss on the bed, a driving-shaft journaled in the said sleeve and having a friction-disk secured to it, a friction-disk interposed between the two aforesaid friction-disks and provided with devices for adjusting its position so that the speed of the shaft H may be varied, and means—such as a screw—for setting up the said sleeve and keeping all the friction-disks in operative contact, substantially as set forth.

6. The combination, with the shaft and the toothed pinion 32, secured thereon and adapted to be turned to vary the extent of the automatic traverse of the grinding-wheel, of a hand-knob adapted to turn the said shaft direct, a worm-wheel, a worm adapted to turn the said shaft through the worm-wheel, and clutch mechanism permitting the said worm and worm-wheel to be disconnected from the said shaft, substantially as set forth.

7. The combination, with the shaft and the toothed pinion 32, secured thereon and adapted to be turned to vary the extent of the automatic traverse of the grinding-wheel, of a hand-knob splined to the said shaft and provided with a friction-clutch, a worm-wheel journaled on the said shaft, a worm gearing into the said worm-wheel, a split sleeve connected to the worm-wheel and provided with a friction-clutch, and a nut screwed on the end of the shaft and adapted to press the two said clutches together and couple the worm-wheel to the shaft, substantially as set forth.

8. The combination, with the retractible shaft and the toothed pinion 32, secured thereon, of the hand-knob splined to the said shaft and provided with a friction-clutch, a worm-wheel journaled on the shaft and provided with a projecting pin, a worm for turning the worm-wheel, a sleeve engaging with the said pin and provided with a friction-clutch, a nut screwed on the end of the shaft and adapted to couple the said clutches, and a spring normally holding the said sleeve and worm-wheel coupled together and permitting the shaft to be retracted so that the said sleeve may be clear of the pin, substantially as set forth.

9. The combination, with the shaft F for traversing the grinding-wheel, of a hand-wheel journaled on the said shaft, intermediate driving-wheels operatively connecting the hand-wheel with the said shaft, a locking-bolt adapted to be slid longitudinally in a hole in the said shaft and provided with two reversely-inclined portions, and two friction-blocks resting on the said inclined portions and adapted to connect the hand-wheel direct to the shaft or through the said intermediate driving-wheels, substantially as set forth.

10. The combination, with the shaft F for traversing the grinding-wheel, of a hand-wheel journaled on the said shaft, a stationary toothed wheel encircling the shaft, a toothed wheel journaled on the shaft, a shaft carried by the hand-wheel and provided with two toothed wheels gearing, respectively, into the aforesaid toothed wheels, and locking mechanism adapted to connect the said shaft to the hand-wheel direct or to the said toothed wheel journaled on it, substantially as set forth.

11. The combination, with the shaft F for traversing the grinding-wheel, of a hand-wheel journaled on the said shaft, a toothed wheel also journaled on the said shaft, intermediate toothed wheels operatively connecting the said toothed wheel with the hand-wheel, a locking-bolt sliding in a hole in the said shaft and provided with two reversely-inclined portions, two friction-blocks resting on the said inclined portions and adapted to be pressed against the hubs of the hand-wheel and of the first said toothed wheel, and means for moving the locking-bolt longitudinally, substantially as set forth.

12. The combination, with the grinding-wheel shaft, of a disk of abrasive material and a carrier secured to the said disk and shaft and provided with a chamber upon one side partially inclosing the shaft-bearing, whereby the said disk may be held opposite the middle portion of the said bearing, substantially as set forth.

13. The combination, with the grinding-wheel bracket, of a pivoted plate provided with a toothed rack, a reciprocating plate arranged between the said bracket and pivoted plate and provided with a sleeve projecting through a slot in the bracket, means for clamping the said bracket to the reciprocating plate, and a shaft journaled in the said sleeve and provided with a toothed pinion gearing into the said rack and adapted to adjust the position of the grinding-wheel bracket, substantially as set forth.

14. The combination, with the shaft $n$, supported by the grinding-wheel bracket and adapted to adjust its position, of a hand-knob splined to the said shaft and provided with a friction-clutch, a worm-wheel journaled on the said shaft and also provided with a friction-clutch, a worm for turning the worm-wheel, springs interposed between the said worm-wheel and hand-knob, and a nut screwed on the end of the shaft and adapted to press the two clutches together against the pressure of the said springs, substantially as set forth.

15. The combination, with the sleeve $i$ and the shaft journaled therein and adapted to adjust the position of the grinding-wheel, of a bracket journaled on the said sleeve and adapted to be secured to it in any position, a worm-wheel operatively connected to the said shaft, and a shaft journaled in the said bracket and provided with a hand-wheel for revolving it, and a worm gearing into the said worm-wheel, substantially as set forth.

16. The combination, with the sleeve $i$ and the shaft journaled therein and adapted to adjust the position of the grinding-wheel, of a bracket secured to the said sleeve and provided with a bearing, a worm-wheel operatively connected to the said shaft, a shaft journaled in the said bearing and provided with a worm gearing into the said worm-wheel, a hand-wheel secured to the worm-shaft, and an adjustable stop secured to the periphery of the hand-wheel and adapted to come in contact with a stop projecting from the said bearing and to arrest the motion of the hand-wheel, substantially as set forth.

17. The combination, with the plate secured to the top of the bed and provided with recesses in those portions of its upper surface upon which the grindings may fall, and a gutter for carrying off the water from the said recesses, of the pivoted table for carrying the head-stock and the foot-stock, said table being provided with recesses in its under surface corresponding with the aforesaid recesses in the plate and having a longitudinal groove near its front edge, substantially as set forth.

18. The combination, with the bracket K, adapted to be traversed longitudinally, of the revoluble plate J, provided with a central boss journaled in a hole in the said bracket, a pin passing through the said plate into a hole in the bracket, and a clamping-screw engaging with the said bracket and provided with a conical end engaging with a conical hole in the said pin, the said plate being adapted to support the grinding-wheel, substantially as set forth.

In testimony whereof I affix my signature in presence of two witnesses.

ABRAHAM B. LANDIS.

Witnesses:
J. E. FRANTZ,
ALF. N. RUSSELL.